United States Patent [19]

Feldman

[11] 4,183,614
[45] Jan. 15, 1980

[54] MICROSCOPE SLIDE
[75] Inventor: Bernard Feldman, Goleta, Calif.
[73] Assignee: Liquidata, Inc., Irvine, Calif.
[21] Appl. No.: 758,058
[22] Filed: Jan. 10, 1977
[51] Int. Cl.² .............................................. G02B 21/34
[52] U.S. Cl. .................. 350/94; 350/162 R;
128/630
[58] Field of Search ................. 350/94, 95, 10, 162 R;
356/244; 96/30–32, 35–36; 128/206 G, 2 G

[56] References Cited
U.S. PATENT DOCUMENTS

| | | | |
|---|---|---|---|
| 1,994,483 | 3/1935 | Ott ........................................ 350/94 |
| 2,328,585 | 9/1943 | Rooney ................................. 350/94 |
| 2,660,091 | 11/1953 | McCallum ............................ 350/94 |
| 3,045,531 | 7/1962 | Prescott ........................... 350/162 R |
| 3,484,154 | 12/1969 | Swing et al. ..................... 350/162 R |
| 3,736,042 | 5/1973 | Markovits et al. ..................... 350/95 |
| 4,018,958 | 4/1977 | Andreeva et al. .................... 350/162 |
| 4,071,364 | 1/1978 | Clark et al. ............................. 96/36 |

Primary Examiner—John K. Corbin
Assistant Examiner—B. W. de los Reyes
Attorney, Agent, or Firm—Harris, Kern, Wallen & Tinsley

[57] ABSTRACT

A microscope slide and method of making same, providing on a substantially transparent substrate, an extremely closely spaced grid pattern of a film less transparent than the substrate, with the pattern produced by photochemical etching, and with the film typically an iridized metal oxide film.

10 Claims, 3 Drawing Figures

ENLARGED VIEW OF CORNER

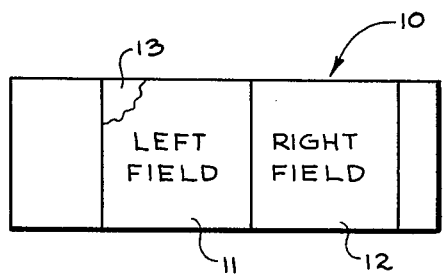
FIG. 1. MICROSCOPE SLIDE
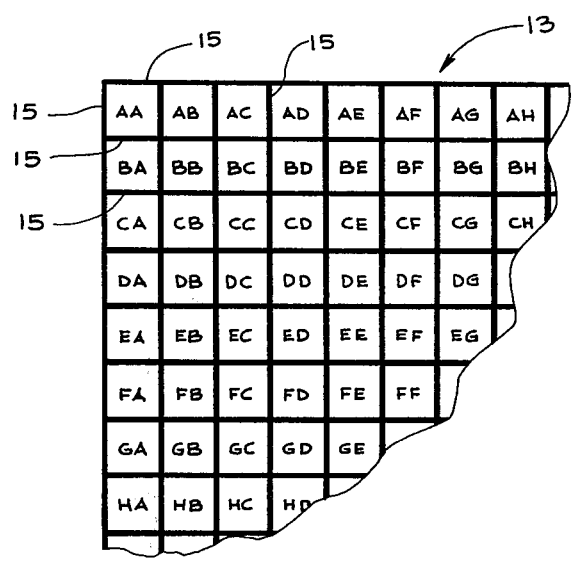
FIG. 2. ENLARGED VIEW OF CORNER
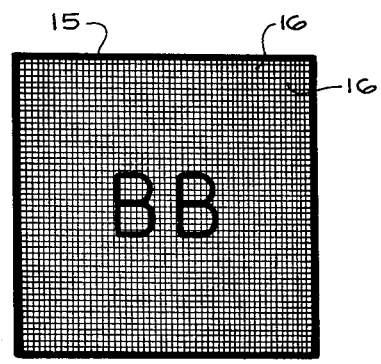
FIG. 3. ENLARGED VIEW OF BB

MICROSCOPE SLIDE

BACKGROUND OF THE INVENTION

This invention relates to microscope slides and the like and to a method for manufacturing such slides. In many applications of a microscope slide, it is desired to have a grid pattern on the slide for measurement purposes. Such a grid needs to have closely spaced lines and very thin lines in order to be of value at the high magnifications utilized in a microscope.

Two general approaches have been used in preparing such slides in the past and both are relatively expensive. In one prior art approach, a pattern is produced in the glass of the slide, as by etching or sandblasting. One embodiment of this approach is shown in U.S. Pat. No. 3,481,659.

In another prior art procedure, a coating in the form of a ceramic glaze or a metal film is applied on the glass substrate and the grid is ruled through the coating as by using a diamond tipped tool. The ruling method is shown in U.S. Pat. Nos. 1,994,483; 2,328,585; and 2,660,091.

It is an object of the present invention to provide a new and improved microscope slide wherein the grid can have very fine lines with very close line spacings. A further object is to provide such a slide where the grid can be quite thin and positioned at the working surface of the substrate so that the image of the grid is sharply defined at the substrate surface, providing an indication of proper focus of the microscope. A further object is to provide such a slide which is relatively inexpensive to manufacture, while utilizing proven manufacturing techniques. An additional object is to provide a grid with indicia in zones for identifying individual zones. Another object is to provide a colored grid on a colorless substrate.

SUMMARY OF THE INVENTION

The microscope slide of the present invention comprises a substrate of a transparent material, typically glass, having a film on one face thereof, with the film having a grid pattern resulting from the removal of predetermined portions of the film and with the film less transparent than the substrate.

The method of the invention includes the steps of applying an iridized metal oxide film onto the face of the transparent substrate, and photochemical etching the grid pattern in the film. Very fine grid patterns can be obtained such as twenty-five to one hundred lines per millimeter, while achieving relatively thin and transparent films, typically in the order of 1,000 to 5,000 angstroms thick.

BRIEF DESCRIPTION OF THE DRAWING

FIG. 1 is a top view of a microscope slide incorporating the presently preferred embodiment of the invention;

FIG. 2 is an enlarged view of a corner portion of one of the grid areas of the slide of FIG. 1; and FIG. 3 is an enlarged view of one of the grid sections of FIG. 2.

DESCRIPTION OF THE PREFERRED EMBODIMENT

The slide of the present invention utilizes a piece of glass or other suitable material as a substrate 10 on which the grid pattern is produced. Typically the substrate 10 may be 1/16 by 1 by 3 inches and ordinarily a plurality of the slides will be produced at one time on a single sheet of glass which may be 12 inches by 15 inches. After the slide manufacturing process is completed, the sheet of glass is cut into the individual slides.

A thin film is applied to one surface of the substrate. While both the substrate and the film desirably are highly transparent, the film should be less transparent than the substrate so that the resulting grid is readily visible.

A suitable material for the film is an iridized metal oxide. Iridized metal oxide films are well known in the art and reference may be had to U.S. Pat. Nos. 2,818,354; 3,134,689; and 3,200,326 for more detailed information on producing an iridized metal oxide film.

Various metals are used in producing iridized metal oxide coatings. A tin oxide coating is presently preferred for the slide of the invention. Iridized metal oxide films are produced by mixing a salt of the desired metal in a liquid carrier and spraying this mixture onto a heated substrate. A tin oxide film may be produced by spraying with a stannic chloride solution. The resulting iridized coatings are generally accepted as being formed primarily of the metal oxide, although there is some difference of opinion as to the exact composition. For the purposes of this application, films of this type are referred to herein as "iridized coatings of metal oxides" or "iridized metal oxide films".

A colored film may be used to enhance viewability. An iridized film using ferric chloride in place of stannic chloride will result in a film with a yellow color. Cobaltic chloride and antimony chloride will produce blue colors when used in iridized films.

It is felt by some parties that these "iridized metal oxide films" contain the metal and oxygen elements in an arrangement which does not constitute a true oxide of metal. Other parties contend that these coating are partially metal oxides and partially metal in a pure state or in combination with other elements. Accordingly, the expressions are intended to include this general type of coating regardless of whether the coating is actually a proper metal oxide, speaking in strict chemical terms.

After the iridized metal oxide film is produced on the substrate, the desired grid pattern is produced by removing selected portions of the film by photochemical etching. In the photochemical etching process, the film is covered with a layer of photosensitive material. After drying, the structure is exposed to light through a suitable mask and then developed to remove all of the photosensitive material which has not been exposed. The remaining exposed portions of the photosensitive material are set, as by heating to an elevated temperature, after which the portions of the iridized film not protected by the set material are removed by etching. Then the set photosensitive material is removed and the photochemical etching process is complete, leaving the desired grid pattern of the film on the substrate.

In the embodiment illustrated in the drawing, two grid patterns 11, 12, each one inch square, are provided on the substrate. Each of the grid patterns 11, 12 actually is a grid of grids and a portion 13 of the pattern 11 is shown in FIG. 2. The one inch square is divided into a plurality of smaller squares by relatively heavy lines 15, with the smaller squares identified by the letter combinations AA, AB, etc. In one embodiment, there are thirty-three such smaller squares along each axis, providing 1089 of the smaller squares in the larger squares 11, 12.

Each of the smaller squares may have a grid pattern therein, and one such smaller square BB is illustrated in FIG. 3, with grid lines 16. Ordinarily, the grid lines 16 will be substantially thinner than the grid lines 15. The letters BB, etc. identifying the smaller squares may be made part of the pattern, as illustrated in FIG. 3. In the embodiment illustrated, the lines in FIGS. 2 and 3 indicate where the iridized metal oxide film is retained on the substrate, with the white spaces indicating where the film has been removed by the etching process.

Very close spacing of the grid lines can be achieved with the process of the present invention. Line densities as great as one hundred lines per millimeter can be provided, with the lines and spaces approximately equal in width. In some applications, a line density of at least twenty-five lines per millimeter is desired. In other applications, a line density of five lines per millimeter or even fewer is satisfactory, it being realized that the lower line density products usually cost less to produce.

The thin film used for the grid may be produced in other ways, such as by evaporation or sputtering. Metal films, such as gold, chromium or aluminum, may be produced in the conventional manner. Oxide films, such as iron oxide ($Fe_2O_3$), indium oxide ($InO_3$) or indium tin oxide ($InSnO_3$), also may be produced following known techniques.

The slide of the present invention provides a number of advantages over earlier products. The thin film grid may be used on the top surface of the slide on which the specimen is placed. The operator may focus the microscope at this grid and know that the focal plane of the instrument is at the position of the sample. This is of critical significance when a specimen is being examined for a negative situation, that is, to determine that a particular component is not present in the specimen. If the operator is not certain that the microscope is focussed at the level of the specimen on the slide, the fact that the item of interest cannot be seen does not necessarily mean that the item of interest is not present in the specimen.

The film grid is inert and most film materials are harder and more durable than the glass substrate. The film may be made to have a slight electrical conductivity, permitting ease in dissipation of electrostatic charge. The measurement grid is sharply defined and accurately produced. The film can be made quite thin, typically in the range of 500 to 10,000 angstroms, with most films in the order of 1,000 to 5,000 angstroms. The films are relatively transparent (though less transparent than the substrate) and do not interfere with observations under bright illumination levels while at the same time being readily viewed at low illumination levels.

For further information on the photochemical etching process, reference may be had to Handbook of Materials and Processes for Electronics by C. A. Harper, McGraw-Hill, 1970, pages 14–111.

I claim:

1. A microscope slide comprising a substrate of substantially transparent material having on one face thereof a film of a thickness in the range of 500–10,000 angstroms and less transparent than said substrate, with said film having a grid pattern resulting from the removal of predetermined portions of said film by photochemical etching whereby the grid pattern is at the focussing surface of the substrate when a specimen is on the substrate.

2. A slide as defined in claim 1 wherein said pattern has lines spaced not less than five per millimeter.

3. A slide as defined in claim 1 wherein said pattern has lines spaced not less than twenty-five per millimeter.

4. A slide as defined in claim 1 wherein said film is an iridized metal oxide film of a thickness 1000–5000 angstroms.

5. A slide as defined in claim 1 wherein said substrate is substantially colorless and said film is colored.

6. A slide as defined in claim 1 wherein said film is divided into a plurality of zones and each zone includes an indicia identifying the zone.

7. A method of making a microscope slide, including the steps of:
applying onto a face of a substantially transparent substrate, a film of a thickness in the range of 500–10,000 angstroms and less transparent than the substrate;
applying a layer of photo sensitive material over said film;
exposing said layer through a mask;
developing said layer to provide a grid pattern of the layer; and
etching a grid pattern in said film through the removed portions of said layer, providing a thin relatively transparent grid pattern of the film on said substrate whereby the grid pattern is at the focussing surface of the substrate when a specimen is on the substrate.

8. The method of claim 7 including etching parallel lines in groups of not less than five per millimeter.

9. The method of claim 7 including etching parallel lines in groups of not less than twenty-five per millimeter.

10. The method of claim 7 including applying an iridized metal oxide film of a thickness about 1,000–5,000 angstroms.

* * * * *